United States Patent
Van Der Lee et al.

(10) Patent No.: US 11,402,551 B2
(45) Date of Patent: Aug. 2, 2022

(54) OPTICAL LENS FOR A PHOTODIODE-EQUIPPED DEVICE

(71) Applicants: Robert Bosch GmbH, Stuttgart (DE); TRUMPF Photonic Components GmbH, Ulm (DE)

(72) Inventors: Alexander Van Der Lee, Venlo (NL); Balazs Jatekos, Budapest (HU); Hans Spruit, Waalre (NL); Peter Jutte, Weert (NL)

(73) Assignees: ROBERT BOSCH GMBH, Stuttgart (DE); TRUMPF PHOTONIC COMPONENTS GMBH, Ulm (DE)

( * ) Notice: Subject to any disclaimer, the term of this patent is extended or adjusted under 35 U.S.C. 154(b) by 348 days.

(21) Appl. No.: 16/541,588

(22) Filed: Aug. 15, 2019

(65) Prior Publication Data
US 2020/0057180 A1   Feb. 20, 2020

(30) Foreign Application Priority Data
Aug. 17, 2018 (DE) .......................... 102018213926.1

(51) Int. Cl.
*G02B 3/00* (2006.01)
*G02B 19/00* (2006.01)
*G02B 27/00* (2006.01)

(52) U.S. Cl.
CPC ........... *G02B 3/00* (2013.01); *G02B 19/0023* (2013.01); *G02B 19/0047* (2013.01); *G02B 27/0012* (2013.01); *G02B 2003/0093* (2013.01)

(58) Field of Classification Search
CPC ............ G02B 19/0014; G02B 19/0023; G02B 19/0047; G02B 19/0057; G02B 2003/0093; G02B 27/0012; G02B 3/00; G02B 3/02
See application file for complete search history.

(56) References Cited

U.S. PATENT DOCUMENTS

| | | | |
|---|---|---|---|
| 7,274,461 B2* | 9/2007 | Seko ....................... | G01S 17/46 359/581 |
| 2012/0268949 A1* | 10/2012 | Parkyn .................. | F21V 7/0091 362/327 |
| 2018/0156408 A1* | 6/2018 | Okubo .................... | F21S 41/00 |

FOREIGN PATENT DOCUMENTS

| | | |
|---|---|---|
| DE | 20 2013 012 202 U1 | 8/2015 |
| DE | 10 2018 116 215 A1 | 1/2020 |
| EP | 3 217 645 A1 | 9/2017 |

OTHER PUBLICATIONS

German Patent Office, Office Action corresponding to German Patent Application No. 10 2018 213 926.1, dated Jun. 2, 2021, München, Germany (10 pages).

* cited by examiner

*Primary Examiner* — Joseph P Martinez
*Assistant Examiner* — Vipin Patel
(74) *Attorney, Agent, or Firm* — Maginot Moore Beck LLP

(57) ABSTRACT

The invention relates to an optical lens (10) for a photodiode-equipped device, which is arrangeable at and/or in the photodiode-equipped device in such a way that light beams (14) emitted by at least two photodiodes of the photodiode-equipped device transmit into the optical lens (10) through a light entrance side (S1) of the optical lens (10) and emerge from the optical lens (10) at a light exit side (S2) of the optical lens (10), and for which a central longitudinal axis (16) extending centrally through the light entrance side (S1) and centrally through the light exit side (S2) is definable, wherein the light entrance side (S1) of the optical lens (10) and the light exit side (S2) of the optical lens (10) are embodied in each case as a freeform surface for off-axis projection in such a way that the light beams (14) emitted by the photodiodes (32) arranged on a circular path around the central longitudinal axis (16) are focused off-axis by means of the optical lens (10).

13 Claims, 6 Drawing Sheets

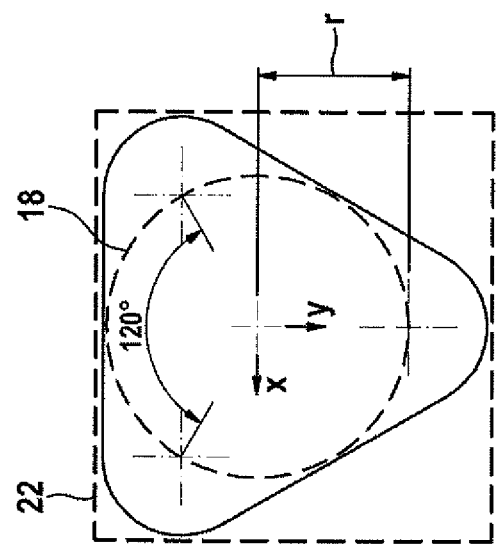
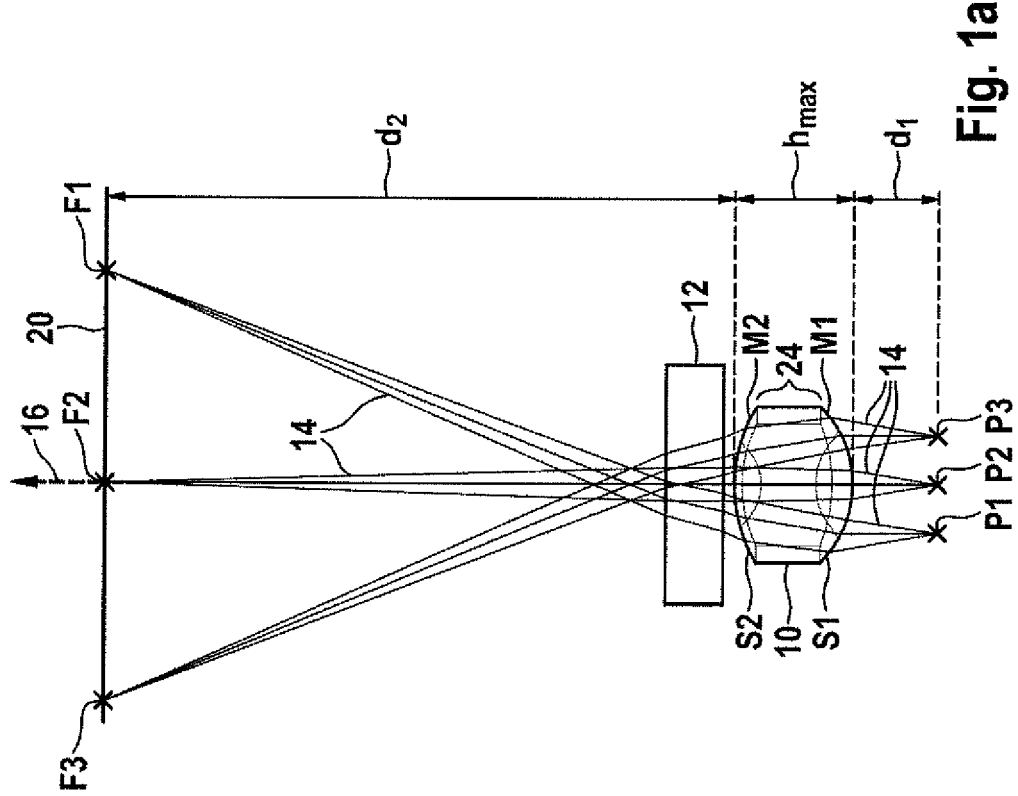

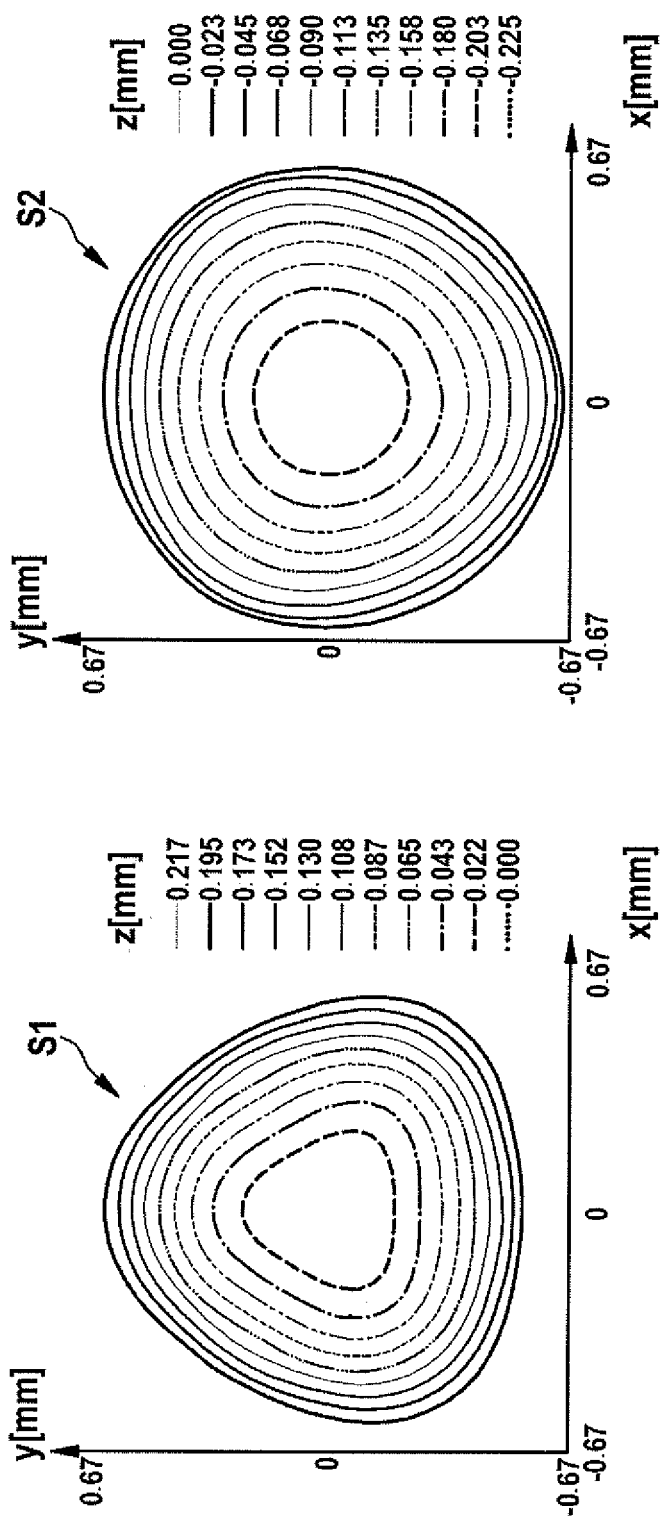

OPTICAL LENS FOR A PHOTODIODE-EQUIPPED DEVICE

This application claims priority to German Application No. DE 102018213926.1, filed on Aug. 17, 2018. The entire contents of the above-mentioned German patent application is incorporated herein by reference as part of the disclosure of this U.S. application.

The present invention relates to an optical lens for a photodiode-equipped device, and to a photodiode-equipped device. The present invention likewise relates to a method for producing an optical lens for a photodiode-equipped device.

PRIOR ART

The prior art discloses a multiplicity of optical lenses, wherein the respective optical lens is arrangeable in a photodiode-equipped device in such a way that light beams emitted by at least two photodiodes of the photodiode-equipped device transmit into the optical lens through a light entrance side of the optical lens and emerge from the optical lens at a light exit side of the optical lens, and wherein a central longitudinal axis of the respective optical lens extending centrally through the light entrance side and centrally through the light exit side is definable.

DISCLOSURE OF THE INVENTION

The present invention provides an optical lens for a photodiode-equipped device having the features of Patent Claim 1, a photodiode-equipped device having the features of Patent Claim 7 and a method for producing an optical lens for a photodiode-equipped device having the features of Patent Claim 11.

Advantages of the Invention

The present invention provides optical lenses for advantageously deflecting the light beams emitted by at least two photodiodes by means of just one of the optical lenses. The respective optical lens combines a plurality of functions of conventional lens elements and thus contributes to reducing a total number of the lens elements used for deflecting the light beams of the at least two photodiodes. In particular, as a rule merely the optical lens according to the invention is sufficient for advantageously deflecting the light beams of the at least two photodiodes arranged on a circular path around the central longitudinal axis of the optical lens, and for focusing the light beams in a desired focusing plane/focal plane. The present invention thus contributes to saving the lens elements, or to reducing the total number of lens elements at and/or in a photodiode-equipped device, and thus also to reducing production costs of the photodiode-equipped device and to minimizing the photodiode-equipped device.

As explained in greater detail below, an optical lens according to the invention can be used both as "prism" for deflecting the light beams of at least two photodiodes and as "optical focusing element" for focusing the light beams in a desired focusing plane. Nevertheless, the optical lens according to the invention can be embodied with relatively small surface areas of its light entrance side and of its light exit side, a comparatively small maximum height and with a small structural space requirement in relation to conventional lens elements.

In one advantageous embodiment of the optical lens, the central longitudinal axis is definable as an axis of symmetry of the optical lens, with respect to which the optical lens has an n-fold rotationally symmetrical shape with respect to a rotation by an angle 360°/n, wherein n is a natural number greater than or equal to 2. As explained in greater detail below, an optical lens of this type is well suited to interaction with a total number of n photodiodes arranged on the circular path thereof around the central longitudinal axis.

By way of example, the optical lens, with respect to its axis of symmetry, can have a three-fold rotationally symmetrical shape with respect to a rotation by an angle of 120° and can have a triangular edge in a cross-sectional plane oriented perpendicular to its axis of symmetry. The lens type described here is well suited to interaction with three photodiodes arranged on the circular path thereof around the central longitudinal axis of the optical lens.

In a further advantageous embodiment, the light entrance side of the optical lens and/or the light exit side of the optical lens are/is embodied in accordance with an n-fold rotationally symmetrical polynomial term. As explained in greater detail below, such a light entrance side and a corresponding light exit side are well suited to fulfilling a multiplicity of functions by means of the optical lens, wherein the light entrance side and the light exit side of the optical lens are nevertheless able to be embodied in a relatively simple manner.

In particular, the light entrance side of the optical lens and/or the light exit side of the optical lens can be embodied in accordance with a three-fold rotationally symmetrical polynomial term such that the following holds true for all points $P(r, \varphi)$ of the light entrance side and/or of the light exit side in a cylindrical coordinate system:

$$z = \frac{cr^2}{1 + \sqrt{1 - (1+k) * c^2 * r^2}} + (\alpha * r^7 + \beta * r^5 + \gamma * r^3) * \cos(3\varphi),$$

wherein c is a curvature, k is a conic constant and $\alpha$, $\beta$, and $\gamma$ are polynomial coefficients in each case of the light entrance side and/or of the light exit side. The embodiment of the optical lens as described here is well suited to fulfilling a multiplicity of functions and is producible in a relatively simple manner.

In an alternative embodiment, the light entrance side of the optical lens and/or the light exit side of the optical lens can be embodied in accordance with a Zernike polynomial such that the following holds true for all points $P(r, \varphi)$ of the light entrance side and/or of the light exit side in a cylindrical coordinate system:

$$z = \Sigma_{n=0}^{M} \Sigma_m (Z_n^m + Z_n^{-m}),$$

wherein m lies in a range between $-n$ and n, m is odd if n is odd, and m is even if n is even, wherein m is divisible by N, and wherein the following holds true:

$$Z_n^m = R_n^m * \cos(m * \varphi),$$

$$Z_n^{-m} = R_n^m * \sin(m * \varphi) \text{ and}$$

$$R_n^m(r) = \sum_{k=0}^{2} \frac{(-1)^k * (n-k)!}{k! * \left(\frac{n+k}{2} - k\right)! * \left(\frac{n-k}{2} - k\right)!} * \frac{r}{r_0}.$$

Such a lens type is also well suited to fulfilling a multiplicity of functions and is producible in a relatively simple manner.

The advantages described above are also ensured in the case of a photodiode-equipped device comprising such an optical lens and the at least two photodiodes, wherein the optical lens is arranged at and/or in the photodiode-equipped device in such a way that the light beams emitted by the at least two photodiodes transmit into the optical lens through the light entrance side of the optical lens and emerge from the optical lens at the light exit side of the optical lens.

Preferably, the photodiode-equipped device comprises a total number n of photodiodes as its at least two photodiodes, wherein n is a natural number greater than or equal to 3, and wherein the optical lens, with respect to its axis of symmetry, has a rotationally symmetrical shape with respect to a rotation by an angle 360°/n. Adapting the rotational symmetry of the optical lens to the total number n of photodiodes makes it possible to ensure a good interaction of optical lens and photodiodes for symmetrically focusing the light beams of the photodiodes.

In one advantageous embodiment of the photodiode-equipped device, the optical lens is arranged with respect to a light-transmissive cover glass of a housing of the photodiode-equipped device in such a way that the light beams emerging from the optical lens at the light exit side transmit through the light-transmissive cover glass into external surroundings of the photodiode-equipped device, wherein the light entrance side of the optical lens and the light exit side of the optical lens are embodied in each case as a freeform surface for off-axis projection in such a way that the light beams emitted by the at least two photodiodes and deflected by means of the optical lens intersect at a beam intersection point lying between the light exit side of the optical lens and the light-transmissive cover glass. Alternatively, the light entrance side of the optical lens and the light exit side of the optical lens can be embodied in each case as a freeform surface for off-axis projection in such a way that the light beams emitted by the at least two photodiodes and deflected by means of the optical lens intersect at a beam intersection point lying in the external surroundings of the photodiode-equipped device, said beam intersection point lying at a distance of at least 2 millimetres from the light-transmissive cover glass. Both embodiments ensure a good safety standard during emission of the light beams.

Furthermore, an implementation of a corresponding method for producing an optical lens for a photodiode-equipped device also affords the advantages already explained above. It is expressly pointed out that the method for producing an optical lens for a photodiode-equipped device can be developed in accordance with the embodiments of the optical lens as explained above.

BRIEF DESCRIPTION OF THE DRAWINGS

Further features and advantages of the present invention are explained below with reference to the figures, in which:

FIGS. 1a and 1b show schematic illustrations of a first embodiment of the optical lens;

FIGS. 3a and 3b show coordinate systems for explaining a third embodiment of the optical lens;

EMBODIMENTS OF THE INVENTION

Figure 2A:
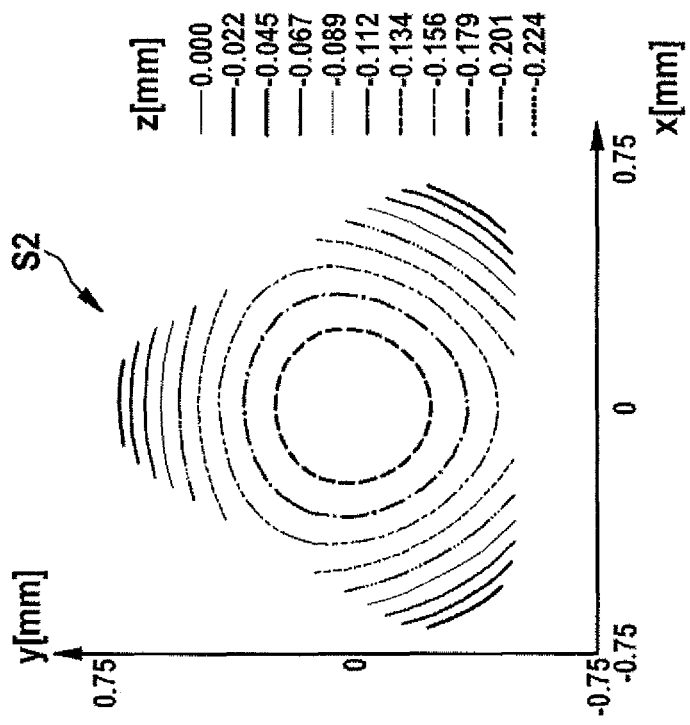
FIGS. 2a and 2b show coordinate systems for explaining a second embodiment of the optical lens.

FIGS. 1a and 1b show schematic illustrations of a first embodiment of the optical lens.

The optical lens 10 illustrated schematically in FIGS. 1a and 1b is usable for a photodiode-equipped device, wherein one advantageous example of the photodiode-equipped device is also described below. It is expressly pointed out that a usability of the optical lens 10 is however not limited to a specific type of photodiode-equipped devices. Therefore, the photodiode-equipped device furnished with the optical lens 10 in the example in FIGS. 1a and 1b is rendered schematically only by means of the positions P1 to P3 of its photodiodes (not illustrated) and by means of a light-transmissive cover glass/light emergence window 12 of the photodiode-equipped device. However, a total number of the three photodiodes of the photodiode-equipped devices and the embodiment of the photodiode-equipped devices with the light-transmissive cover glass 12 should be interpreted to be merely by way of example.

The optical lens 10 is arrangeable/arranged at and/or in the photodiode-equipped device in such a way that light beams 14 emitted by the at least two photodiodes of the photodiode-equipped device transmit into the optical lens 10 through a light entrance side S1 of the optical lens 10. The light beams 14 transmitting through the optical lens 10 emerge from the optical lens 10 at a light exit side S2 of the optical lens 10. The light beams 14 can be e.g. in the visible spectrum and/or in the infrared range, specifically in the near infrared range (i.e. around 850 nm). A central longitudinal axis 16 extending centrally through the light entrance side S1 and centrally through the light exit side S2 is also definable for the optical lens 10.

As is discernible in FIG. 1b, the at least two photodiodes of the photodiode-equipped device are arranged on a circular path 18 having a radius r around the central longitudinal axis 16. The light entrance side S1 and the light exit side S2 of the optical lens 10 are embodied in such a way that the light beams 14 emitted by the photodiodes arranged on the circular path 18 are focused off-axis by means of the optical lens 10. The focal points F1 to F3 brought about by off-axis focusing of the light beams 14 of the at least two photodiodes by means of the optical lens 10 lie in a focusing plane 20. The light entrance side S1 of the optical lens 10 and the light exit side S2 of the optical lens 10 are thus designed for off-axis projection of the light beams 14 of the at least two photodiodes arranged on the circular path 18. This is ensured by virtue of the light entrance side S1 of the optical lens 10 and the light exit side S2 of the optical lens 10 being embodied in each case as a freeform surface. The optical lens 10 can therefore also be referred to as an optical freeform element.

As a result of the advantageous embodiment of the light entrance surface S1 and of the light exit surface S2 of the optical lens 10 in each case as a freeform surface, the optical lens 10 can be used as sole lens element for off-axis projection and for high-quality off-axis focus of the light beams 14 of a plurality of photodiodes. By way of example, the optical lens 10 as sole lens element is sufficient for off-axis projection of the light beams 14 of the three photodiodes arranged in the positions P1 to P3 of the photodiode-equipped devices rendered schematically in FIG. 1a. By contrast, in the prior art, three conventional lens elements are often used for deflecting and focusing the beams emitted by three photodiodes.

Therefore, the embodiment of the optical lens 10 with the light entrance surface S1 and the light exit surface S2 in each case as a freeform surface contributes to saving conventionally required lens elements, and thus to reducing a total number of lens elements at and/or in the photodiode-equipped device. By reducing the total number of its lens elements, it is possible to reduce production costs of the photodiode-equipped device and a structural space requirement of the lens elements used at and/or in said photodiode-equipped device.

The use of the optical lens 10 additionally makes it possible to arrange the photodiodes of the photodiode-equipped device on a circular path 18 having a relatively small radius r. The radius r of the circular path 18 can be e.g. less than 1 mm (millimetre). Preferably, the radius r of the circular path 18 lies in a range between 0.3 mm (millimetre) and 0.7 mm (millimetre), preferably in a range between 0.4 mm (millimetre) and 0.6 mm (millimetre). Furthermore, a distance $d_1$ between the light entrance side S1 of the optical lens 10 and the photodiodes arranged on the circular path 18 can also be less than 1 mm (millimetre). The distance $d_1$ between the light entrance side S1 of the optical lens 10 and the photodiodes arranged on the circular path 18 can be for example between 0.2 mm (millimetre) and 0.8 mm (millimetre), in particular between 0.3 mm (millimetre) and 0.7 mm (millimetre). By contrast, a distance $d_2$ between the light exit side S2 of the optical lens 10 and the focusing plane 20 can be significantly greater than the distance $d_1$ between the light entrance side S1 of the optical lens 10 and the photodiodes arranged on the circular path 18. The distance $d_2$ between the light exit side S2 of the optical lens 10 and the focusing plane 20 is for example between 3 mm (millimetres) and 8 mm (millimetres), specifically between 4 mm (millimetres) and 6 mm (millimetres).

A further advantage of the optical lens 10 is the possibility of it being able to be embodied in a small fashion. The optical lens 10 is able to be embodied in a simple manner such that its maximum extents (perpendicular to the central longitudinal axis 16 of the lens 10) rendered by means of the square 22 in FIG. 1b are less than 3 mm (millimetres), in particular less than 2 mm (millimetres), specifically less than 1.5 mm (millimetres). A maximum height $h_{max}$ of the optical lens (parallel to the central longitudinal axis 16 of the lens 10) can also be less than 2 mm (millimetres), in particular less than 1.5 mm (millimetres).

The use of the optical lens 10 instead of a plurality of conventional lens elements in the photodiode-equipped device thus facilitates a minimization of the photodiode-equipped device. Likewise, by means of the use of the optical lens 10 instead of a plurality of conventional lens elements, it is possible to improve a beam quality when deflecting the light beams 14 and a focusing sharpness when focusing the light beams 14.

The photodiodes are preferably arranged on the circular path 18 with the same intermediate angles between their positions P1 to P3. This can also be referred to as an equidistant, rotationally symmetrical or circularly symmetrical distribution of the photodiodes on the circular path 18. Undesired interference of the light beams 14 emitted by the different photodiodes can thus easily be precluded.

The central longitudinal axis 16 of the optical lens 10 is preferably also an axis of symmetry 16 of the optical lens 10 in such a way that the optical lens 10, with respect to the axis of symmetry 16, has an n-fold rotationally symmetrical shape with respect to a rotation by an angle 360°/n, wherein n is a natural number greater than or equal to 2. The number n can be, in particular, equal to the total number of the photodiodes arranged on the circular path 18 around the axis of symmetry 16. In this case, the light beams 14 emitted by the photodiodes arranged equidistantly on the circular path 18 can be focused onto the focusing plane 20 rotationally symmetrically with respect to the axis of symmetry 16, wherein the focal points F1 to F3 formed lie in the focusing plane 20 with the same intermediate angles rotationally symmetrically with respect to the axis of symmetry 16.

The shape of the optical lens 10 can be described as "doubly convex". In the example in FIGS. 1a and 1b, the optical lens 10 has a three-fold rotationally symmetrical shape with respect to a rotation about its axis of symmetry 16 by an angle of 120°. Moreover, the optical lens 10 has a triangular edge in a cross-sectional plane oriented perpendicular to its axis of symmetry 16. The triangular edge of the optical lens 10 can be understood to be a "rounded triangular shape" of the optical lens 10, i.e. a "triangular shape having rounded corners" of the optical lens 10, in the cross-sectional plane oriented perpendicular to the axis of symmetry 16 of said optical lens. The optical lens 10 is thus well suited to the three photodiodes of the photodiode-equipped devices rendered schematically in FIG. 1a, said photodiodes being arranged in the positions P1 to P3 (with the same intermediate angles of 120°) on the circular path 18.

The optical lens 10 preferably comprises a substrate 24 having a constant layer thickness, wherein a first material M1 for shaping the light entrance side S1 is applied (directly or indirectly) on a first surface of the substrate 24 and a second material M2 for shaping the light exit side S2 is deposited (directly or indirectly) on a second surface of the substrate 24, said second surface being directed away from the first surface. The substrate 24 can be a glass substrate. In particular, the substrate 24 can be composed of borosilicate glass. The layer thickness of the substrate 24 preferably lies in a range between 0.2 mm (millimetre) and 1 mm (millimetre), in particular in a range between 0.3 mm (millimetre) and 0.8 mm (millimetre), preferably in a range between 0.4 mm (millimetre) and 0.6 mm (millimetre).

Optionally, a respective intermediate layer can also be present between the first surface of the substrate 24 and the first material and/or between the second surface of the substrate 24 and the second material. The respective intermediate layer can be composed of resin, for example. A layer thickness of the respective intermediate layer can lie in a range between 0.05 mm (millimetre) and 0.2 mm (millimetre).

The first material M1 and/or the second material M2 can be a plastic in each case. A maximum height of the first material M1 applied (directly or indirectly) on the first surface of the substrate 24 and a maximum height of the second material M2 deposited (directly or indirectly) on the second surface of the substrate 24 can lie in a range between 50 μm (micrometres) and 600 μm (micrometres), e.g. in a range between 100 μm (micrometres) and 400 μm (micrometres), in particular in a range between 200 μm (micrometres) and 300 μm (micrometres).

The light entrance side S1 of the optical lens 10 and/or the light exit side S2 of the optical lens 10 can be embodied in accordance with an n-fold rotationally symmetrical polynomial term. In the example in FIGS. 1a and 1b, the light entrance side S1 of the optical lens 10 and the light exit side S2 of the optical lens 10 are embodied in accordance with a three-fold rotationally symmetrical polynomial term such that for all points P(r, φ) of the light entrance side and/or of the light exit side in a cylindrical coordinate system, the z-axis of which is the axis of symmetry 16 of the optical lens 10, equation (equ. 1) holds true, where:

$$z = \frac{cr^2}{1 + \sqrt{1-(1+k)*c^2*r^2}} + (\alpha*r^7 + \beta*r^5 + \gamma*r^3)*\cos(3\varphi), \quad \text{(equ. 1)}$$

wherein c is a curvature, k is a conic constant and α, β, and γ are polynomial coefficients in each case of the light entrance side S1 and of the light exit side S2. Preferably, for the light entrance side S1, the curvature c lies in a range between 0.5 mm$^{-1}$ and 2 mm$^{-1}$, the conic constant k lies in a range between −1 and −4, the polynomial coefficient α lies in a range between 0.01 mm$^{-6}$ and 0.3 mm$^{-6}$, the polynomial coefficient β lies in a range between −0.01 mm$^{-4}$ and −0.4 mm$^{-4}$ and the polynomial coefficient γ lies in a range between 0.01 mm$^{-2}$ and 0.2 mm$^{-2}$. Correspondingly, for the light exit side S2, combinations are preferred in which the curvature c lies in a range between −0.5 mm$^{-1}$ and −2 mm$^{-1}$, the conic constant k lies in a range between −1 and −4, the polynomial coefficient α lies in a range between 0 and −0.3 mm$^{-7}$, the polynomial coefficient β lies in a range between 0 and 0.4 mm$^{-5}$ and the polynomial coefficient γ lies in a range between 0 and −0.2 mm$^{-3}$.

Figure 2B:
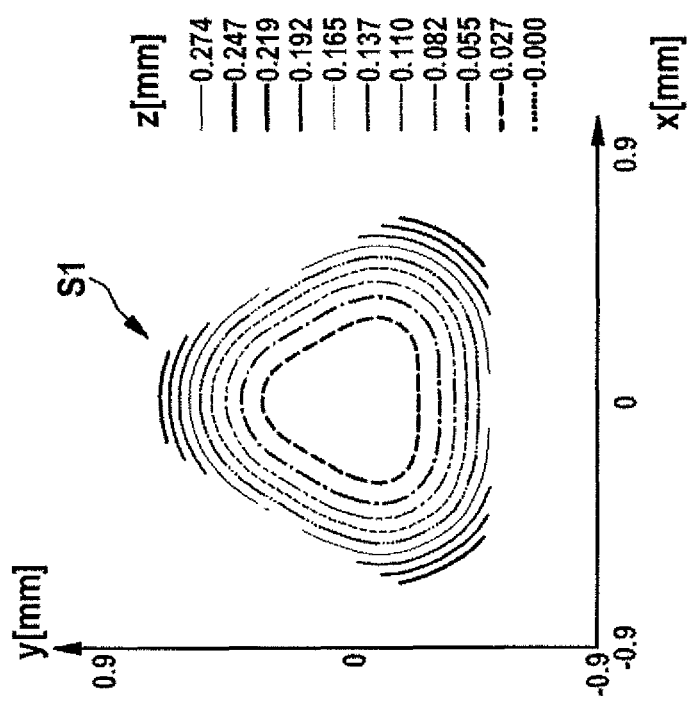

FIGS. 2a and 2b show coordinate systems for explaining a second embodiment of the optical lens.

The optical lens 10 rendered by means of FIGS. 2a and 2b differs from the embodiment described above merely in that its light entrance side S1 and its light exit side S2 are embodied in accordance with a Zernike polynomial. For all points P(r, φ) of the light entrance side S1 and of the light exit side S2, equation (equ. 2) holds true in a cylindrical coordinate system, the z-axis of which is the axis of symmetry 16 of the optical lens 10, where:

$$z = \Sigma_{n=0}^{M} \Sigma_m (Z_n^m + Z_n^{-m}), \quad \text{(equ.2)}$$

wherein m lies in a range between −n and n, m is odd if n is odd, and m is even is n is even (including 0), wherein m is divisible by N, and wherein equations (equ. 3) to (equ. 5) hold true, where:

$$Z_n^m = R_n^m * \cos(m*\varphi) \quad \text{(equ. 3)}$$

$$Z_n^{-m} = R_n^m * \sin(m*\varphi) \quad \text{(equ. 4)}$$

$$R_n^m(r) = \sum_{k=0}^{2} \frac{(-1)^k * (n-k)!}{k! * \left(\frac{n+k}{2}-k\right)! * \left(\frac{n-k}{2}-k\right)!} * \frac{r}{r_0} \quad \text{(equ. 5)}$$

In the embodiment in FIGS. 2a and 2b, the light entrance side S1 and the light exit side S2 of the optical lens 10 are shaped by means of high precision plastic moulding. Preferably, polymethyl methacrylate (PMMA), polycarbonate (PC), a cycloolefin copolymer (COP or COC), ULTEM and/or EXTEM are/is used as first material M1 and/or as second material M2.

With regard to further properties of the optical lens 10 rendered by means of FIGS. 2a and 2b, reference is made to the embodiment described above.

FIGS. 3a and 3b show coordinate systems for explaining a third embodiment of the optical lens.

In the case of the optical lens 10 rendered schematically by means of FIGS. 3a and 3b, too, the light entrance side S1 and the light exit side S2 of the optical lens 10 are embodied in accordance with a Zernike polynomial. However, the light entrance side S1 and the light exit side S2 are printed by means of WLO manufacturing (wafer level optical manufacturing). On account of the choice of different first materials M1 and second materials M2 for implementing WLO manufacturing, the surfaces S1 and S2 rendered schematically in FIGS. 3a and 3b deviate from the examples in FIGS. 2a and 2b.

With regard to further properties of the optical lens 10 rendered by means of FIGS. 3a and 3b, reference is made to the embodiments described above.

In all of the optical lenses 10 explained above, the shape of the light entrance side S1 of the respective optical lens 10 is relatively "robust" vis-à-vis deviations of the positions P1 to P3 of the laser diodes from their desired positions and/or vis-à-vis a slight inclination of the optical lens 10 from its desired position.

Figure 4C:
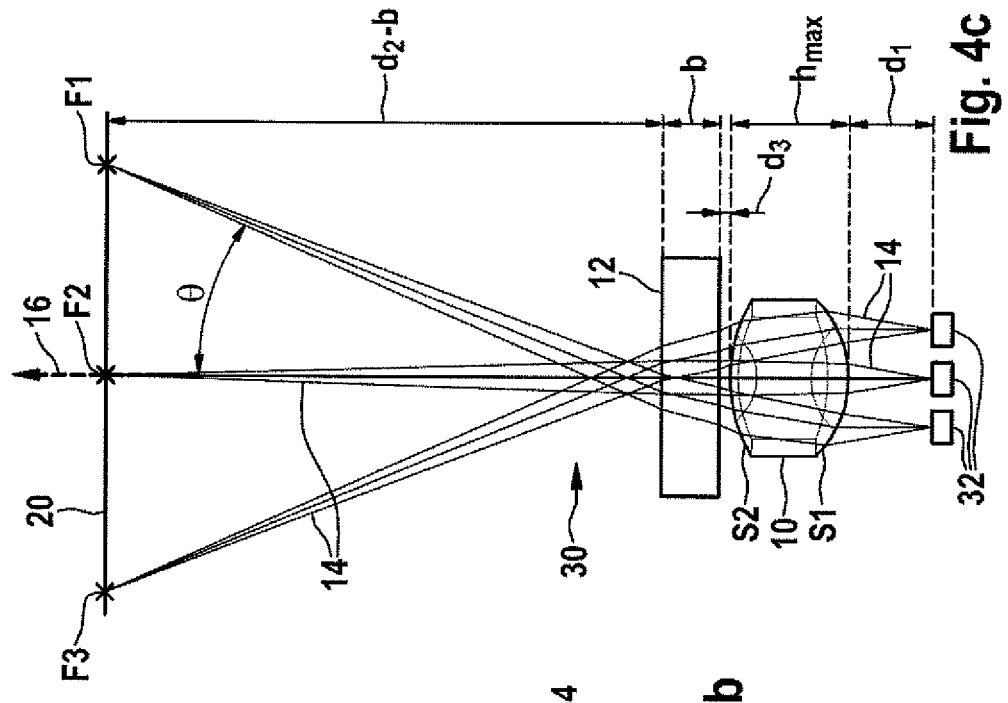
FIGS. 4a to 4c show schematic overall and partial illustrations of a first embodiment of the photodiode-equipped device.
Figure 4B:
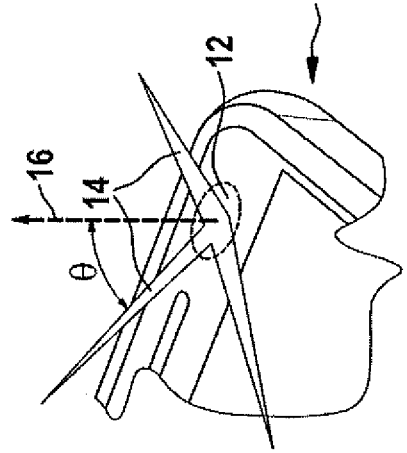
Figure 4A:
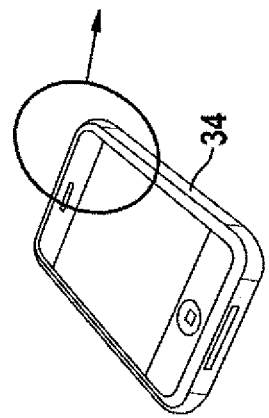

FIGS. 4a to 4c show schematic overall and partial illustrations of a first embodiment of the photodiode-equipped device.

The photodiode-equipped device 30 rendered schematically by means of FIGS. 4a to 4c comprises one of the optical lenses 10 described above. Moreover, the photodiode-equipped device 30 comprises at least two photodiodes 32, for example three photodiodes 32. The photodiodes 32 can be mounted e.g. on a printed circuit board (PCB) (not depicted) of the photodiode-equipped device 30.

The optical lens 10 is arranged at and/or in the photodiode-equipped device 30 in such a way that the light beams 14 emitted by the at least two photodiodes 32 transmit into the optical lens 10 through the light entrance side S1 of the optical lens 10 and emerge from the optical lens 10 at the light exit side S2 of the optical lens 10. Merely by way of example, the optical lens 10 is arranged behind a light-transmissive cover glass/light emergence window 12 of the photodiode-equipped device 30 in such a way that the light beams 14 emerging from the optical lens 10 at the light exit side S2 transmit through the light-transmissive cover glass 12 into external surroundings of the photodiode-equipped device 30. The light-transmissive cover glass 12 can be composed of borosilicate glass, for example. A thickness b of the light-transmissive cover glass 12 can lie in a range between 0.2 mm (millimetre) and 0.8 mm (millimetre). A distance $d_3$ between the light-transmissive cover glass 12 and the light exit side S2 of the optical lens 10 can be between 20 μm (micrometres) and 200 μm (micrometres).

Although not discernible in FIG. 4c, the at least two photodiodes 32 lie on a circular path around the central longitudinal axis/axis of symmetry 16 of the optical lens 10. Preferably, the optical lens 10 has a rotationally symmetrical shape with respect to a rotation by an angle 360°/n with respect to its axis of symmetry 16, wherein n is a natural number greater than or equal to 3 and is equal to a total number of the photodiodes 32 of the photodiode-equipped device 30. In the example in FIGS. 4a to 4c, the photodiode-equipped device 30 has exactly three photodiodes 32, for which reason the above-described three-fold rotationally symmetrical shape with respect to a rotation about the axis of symmetry 16 by an angle of 120° and the triangular edge in the cross-sectional plane of the optical lens 10 oriented perpendicular to the axis of symmetry 16 thereof are preferred for said optical lens. With regard to further features of the optical lenses 10, reference is made to the explanations above.

In the example in FIGS. 4a to 4c, the photodiode-equipped device 30 is a sensor device 30, for example for a sensor device 30 for detecting (dust) particles in the surroundings of an apparatus 34, into the housing of which the sensor device 30 is integrated. An embodiment of a dedicated housing of the sensor device 30 can thus also be disposed with. By way of example, the apparatus 34 is a mobile apparatus 34, in particular a smartphone 34. However, it is pointed out that a possibility of embodying the apparatus 34 is not restricted to this type of mobile apparatus. By way of example, the apparatus 34 can also be a mobile phone, a tablet, a Kindle or an iPod. Likewise, the apparatus 34 can also be an apparatus which is not used in mobile fashion.

During operation of the sensor device 30, the focal points F1 to F3 generated by means of the optical lens 10 can be used for detecting (dust) particles, or for measuring a concentration of the (dust) particles, and/or for determining a spectrum of diameters of the (dust) particles, in a measurement volume illuminated by the focal points F1 to F3 generated. The light beams 14 emitted by the photodiodes 32 and focused by means of the optical lens 10 preferably lie in the near infrared range (i.e. around 850 nm). In this case, the (dust) particles detectable by means of the focal points F1 to F3 generated can even have a diameter of less than 2.5 μm (micrometres). On account of the advantageous embodiment of the light entrance surface S1 and the light exit surface S2 of the optical lens 10 in each case as a freeform surface, an inclination angle Θ between the central longitudinal axis/axis of symmetry 16 of the optical lens 10 and each of the light beams 14 emerging from the sensor device 30 can be comparatively large. The inclination angle Θ can lie e.g. in a range between 25° and 55°. On account of the comparatively large inclination angle Θ between the central longitudinal axis/axis of symmetry 16 of the optical lens 10 and each of the light beams 14 emerging from the sensor device 30, "quasi-three-dimensional illumination" of the surroundings of the apparatus 34 by means of the focal points F1 to F3 generated is possible. The optical lens 10 is thus well suited to determining an air quality. However, the herein described use of the optical lens 10 in the sensor device 30 for detecting (dust) particles should be interpreted as merely by way of example.

Figure 5:
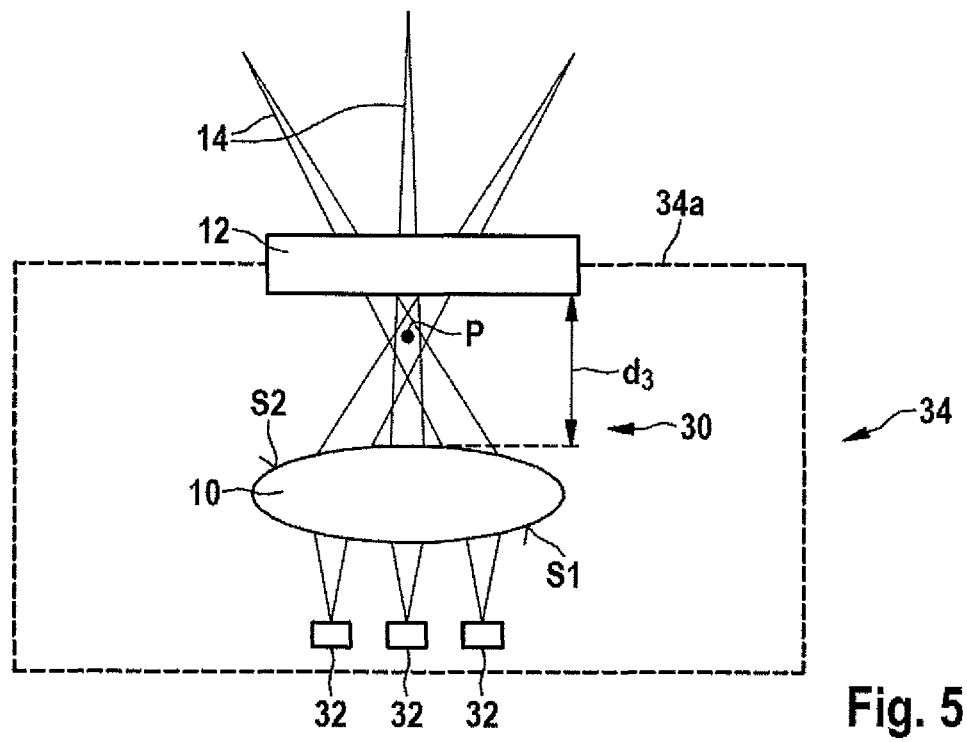
FIG. 5 shows a schematic overall illustration of a second embodiment of the photodiode-equipped device.

FIG. 5 shows a schematic overall illustration of a second embodiment of the photodiode-equipped device.

In the case of the photodiode-equipped device 30 in FIG. 5, too, the optical lens 10 is arranged with respect to the light-transmissive cover glass 12 of the housing 34a of the photodiode-equipped device 30 in such a way that the light beams 14 emerging from the optical lens 10 at the light exit side S2 transmit through the light-transmissive cover glass 12 into the external surroundings of the photodiode-equipped device 30. The housing 34a of the photodiode-equipped device 30 is the housing of the apparatus 34 embodied with the photodiode-equipped device 30. The housing 34a can be embodied in particular as a closed housing 34a.

The light entrance side S1 of the optical lens 10 and the light exit side S2 of the optical lens 10 are embodied in each case as a freeform surface for off-axis projection in such a way that the light beams 14 emitted by the at least two photodiodes 32 and deflected by means of the optical lens 10 intersect at a beam intersection point P lying between the light exit side S2 of the optical lens 10 and the light-transmissive cover glass 12. The beam intersection point P of the light beams emitted by the at least two photodiodes 32 thus lies at a distance from the light exit side S2 of the optical lens 10 which is less than the distance $d_3$ between the light-transmissive cover glass 12 and the light exit side S2 of the optical lens 10.

The beam intersection point P at which the light beams 14 emitted by the at least two photodiodes 32 and deflected by means of the optical lens 10 intersect has a maximum light intensity which is equal to a sum of the individual light intensities of the at least two photodiodes 32. As a result of the embodiment of the optical lens 10 in such a way that the beam intersection point P of the light beams 14 lies between the light exit side S2 of the optical lens 10 and the light-transmissive cover glass 12, an undesired light incidence of the maximum light intensity focused at the beam intersection point P into a person's eye is reliably prevented. Since the beam intersection point P lies in the housing 34a, it is virtually impossible for the maximum light intensity focused at the beam intersection point P to be deflected into the person's eye. The housing 34a as a rule prevents an undesired deflection of the maximum light intensity focused at the beam intersection point P by means of a specularly reflective object brought to the beam intersection point P.

With regard to further features of the photodiode-equipped device 30 in FIG. 5, reference is made to the descriptions above.

Figure 6:
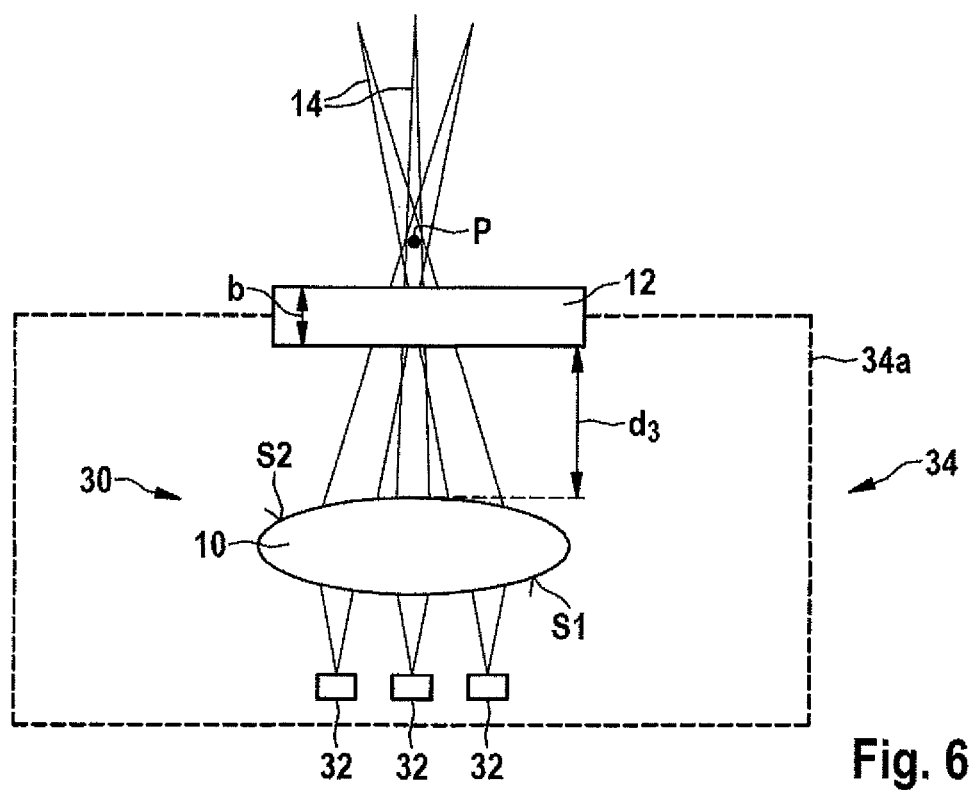
FIG. 6 shows a schematic overall illustration of a third embodiment of the photodiode-equipped device.

FIG. 6 shows a schematic overall illustration of a third embodiment of the photodiode-equipped device.

The photodiode-equipped device 30 shown schematically in FIG. 6 differs from the embodiment described previously merely in that the light entrance side S1 of the optical lens 10 and the light exit side S2 of the optical lens 10 are embodied in each case as a freeform surface for off-axis projection in such a way that the light beams 14 emitted by the at least two photodiodes 32 and deflected by means of the optical lens 10 intersect at a beam intersection point P lying in the external surroundings of the photodiode-equipped device 30. Moreover, the beam intersection point P at which the light beams 14 emitted by the at least two photodiodes 32 and deflected by means of the optical lens 10 intersect lies at a distance of at least 2 millimetres from the light-transmissive cover glass 12. The beam intersection point P of the light beams emitted by the at least two photodiodes 32 thus lies at a distance from the light exit side S2 of the optical lens 10 which is greater than a sum of the thickness b of the light-transmissive cover glass 12 and the distance $d_3$ between the light-transmissive cover glass 12 and the light exit side S2 of the optical lens 10.

This prevents the beam intersection point P at which the individual light intensities of the at least two photodiodes 32 add up to the maximum light intensity from being inadvertently deflected into a person's eye by means of a specularly reflective object which lies on the light-transmissive cover glass 12 or is pushed over the light-transmissive cover glass 12. By means of a specularly reflective object lying on the light-transmissive cover glass 12 or pushed over the light-transmissive cover glass 12, thus at most an individual light intensity of one of the at least two photodiodes 32 can be deflected into a person's eye.

It is preferred, however, if the distance between the beam intersection point P and the light-transmissive cover glass 12 is not greater than 10 millimetres. It is very unlikely that a specularly reflective object such as, for example, a key, part of a key fob, a crystal, a piece of jewellery or an object of glass will be moved past the light-transmissive cover glass 12 at a distance of between 2 millimetres and 10 millimetres.

With regard to further features of the photodiode-equipped device 30 in FIG. 6, reference is made to the descriptions above.

Figure 7B:
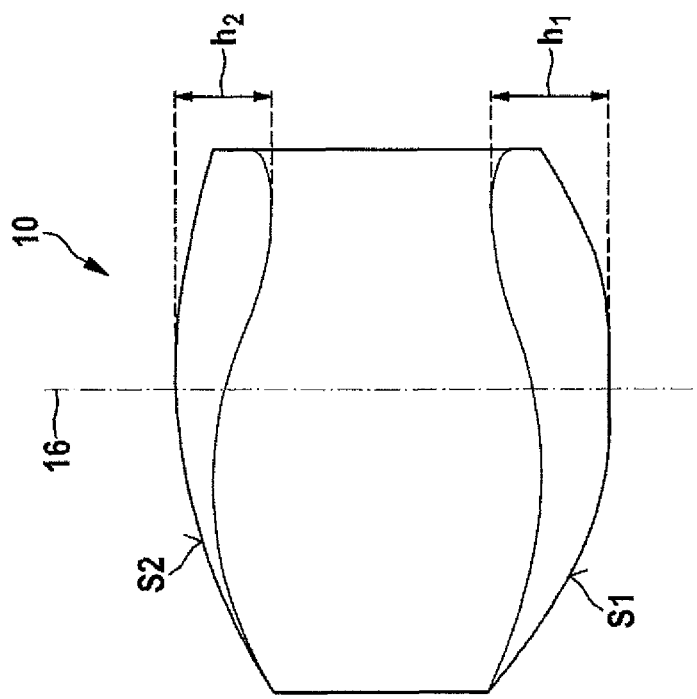
FIGS. 7a and 7b show schematic illustrations of an optical lens for explaining an embodiment of the method for producing an optical lens for a photodiode-equipped device.
Figure 7A:
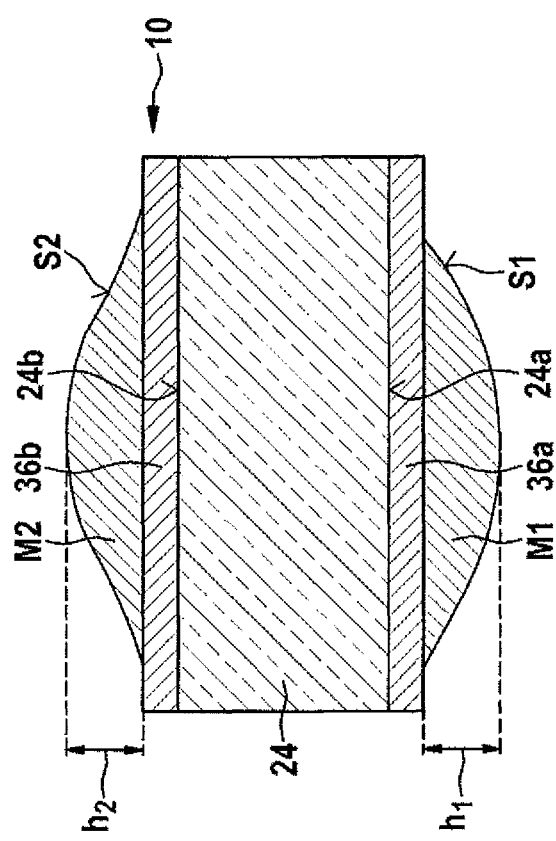

FIGS. 7a and 7b show schematic illustrations of an optical lens for explaining an embodiment of the method for producing an optical lens for a photodiode-equipped device.

In the method rendered schematically by means of FIGS. 7a and 7b, the optical lens 10 is embodied with a light entrance side S1 and with a light exit side S2 in such a way that after arranging the finished optical lens 10 in the photodiode-equipped device 30, light beams emitted by at least two photodiodes of the photodiode-equipped device transmit into the optical lens 10 through the light entrance side S1 and emerge from the optical lens 10 at the light exit side S2 and a central longitudinal axis 16 extending centrally through the light entrance side S1 and centrally through the light exit side S2 is present. Moreover, the light entrance side S1 of the optical lens 10 and the light exit side S2 of the optical lens 10 are embodied in each case as a freeform surface for off-axis projection in such a way that the light beams emitted by the photodiodes arranged on a circular path around the central longitudinal axis 16 are focused off-axis by means of the optical lens 10.

Preferably, the central longitudinal axis 16 of the optical lens 10 is embodied as an axis of symmetry 16 of the optical lens 10 by virtue of the optical lens 10, with respect to its axis of symmetry 16, being embodied with a rotationally symmetrical shape with respect to a rotation by an angle 360°/n, wherein n is a natural number greater than or equal to 3. Preferably, in this case, n is also equal to a total number of the photodiodes of the photodiode-equipped device.

As discernible in FIGS. 7a and 7b, the optical lens 10 can be formed from a substrate 24 by a first material M1 for shaping the light entrance side S1 being applied (directly or indirectly) on a first surface 24a of the substrate 24 and a second material M2 for shaping the light exit side S2 being applied (directly or indirectly) on a second surface 24b of the substrate 24, said second surface being directed away from the first surface 24a. Numerical values for the layer thickness of the substrate 24 and suitable materials for the substrate 24, the first material M1 and the second material M2 have already been indicated above. Optionally, a respective intermediate layer 36a and 36b, in particular composed of resin, is also formed between the first surface 24a and the first material M1 and/or between the second surface 24b and the second material M2. Numerical values for the layer thickness of the respective intermediate layer 36a and 36b have been mentioned above.

The first material M1 and/or the second material M2 can be brought to the desired shapes of the light entrance side S1 and/or of the light exit side S2 by means of high precision plastic moulding and/or by means of WLO manufacturing (wafer level optical manufacturing). In this case, the light entrance side S1 and/or the light exit side S2 are preferably shaped in accordance with an n-fold rotationally symmetrical polynomial term and/or in accordance with a Zernike polynomial. Advantageous numerical values for the polynomials and for a maximum height $h_1$ of the first material M1 applied (directly or indirectly) on the first surface 24a and for a maximum height $h_2$ of the second material M2 deposited (directly or indirectly) on the second surface 24b have already been enumerated above.

All of the optical lenses 10 explained above can be produced by means of the method described here.

The invention claimed is:

1. An optical lens for a photodiode-equipped device, which is arrangeable at and/or in the photodiode-equipped device in such a way that light beams emitted by at least two photodiodes of the photodiode-equipped device transmit into the optical lens through a light entrance side of the optical lens and emerge from the optical lens at a light exit side of the optical lens; and for which a central longitudinal axis extending centrally through the light entrance side and centrally through the light exit side is defined, wherein the light entrance side of the optical lens and the light exit side of the optical lens are embodied in each case as a freeform surface for off-axis projection in such a way that the light beams emitted by the photodiodes arranged on a circular path around the central longitudinal axis are focused off-axis by means of the optical lens;

the central longitudinal axis defines an axis of symmetry of the optical lens; and the light entrance side of the optical lens and/or the light exit side of the optical lens are/is embodied in accordance with a three-fold rotationally symmetrical polynomial term such that the following equation holds true for all points P(r, φ) of the light entrance side and/or of the light exit side in a cylindrical coordinate system—

$$z = \frac{cr^2}{1+\sqrt{1-(1+k)*c^2*r^2}} + (\alpha*r^7 + \beta*r^5 + \gamma*r^3)*\cos(3\varphi),$$

in which c is a curvature, k is a conic constant and α, β and γ are polynomial coefficients in each case of the light entrance side and/or of the light exit side.

2. The optical lens according to claim 1, wherein the optical lens has a triangular edge in a cross-sectional plane oriented perpendicular to its axis of symmetry.

3. A photodiode equipped device comprising:
an optical lens according to claim 1; and
the at least two photodiodes;
wherein the optical lens is arranged at and/or in the photodiode-equipped device in such a way that the light beams emitted by the at least two photodiodes transmit into the optical lens through the light entrance side of the optical lens and emerge from the optical lens at the light exit side of the optical lens.

4. The photodiode-equipped device according to claim 3, wherein the optical lens is arranged with respect to a light-transmissive cover glass of a housing of the photodiode-equipped device in such a way that the light beams emerging from the optical lens at the light exit side transmit through the light-transmissive cover glass into external surroundings of the photodiode-equipped device, and wherein the light entrance side of the optical lens and the light exit side of the optical lens are embodied in each case as a freeform surface for off-axis projection in such a way that the light beams emitted by the at least two photodiodes and deflected by means of the optical lens intersect at a beam intersection point lying between the light exit side of the optical lens and the light-transmissive cover glass.

5. The photodiode-equipped device according to claim 3, wherein the optical lens is arranged with respect to the light-transmissive cover glass of the housing of the photodiode-equipped device in such a way that the light beams emerging from the optical lens at the light exit side transmit through the light-transmissive cover glass into external surroundings of the photodiode-equipped device, and wherein the light entrance side of the optical lens and the light exit side of the optical lens are embodied in each case as a freeform surface for off-axis projection in such a way that the light beams emitted by the at least two photodiodes and deflected by means of the optical lens intersect at a beam intersection point lying in the external surroundings of the photodiode-equipped device, said beam intersection point lying at a distance of at least 2 millimetres from the light-transmissive cover glass.

6. An optical lens for a photodiode-equipped device,
which is arrangeable at and/or in the photodiode-equipped device in such a way that light beams emitted by at least two photodiodes of the photodiode-equipped device transmit into the optical lens through a light entrance side of the optical lens and emerge from the optical lens at a light exit side of the optical lens; and
for which a central longitudinal axis extending centrally through the light entrance side and centrally through the light exit side is defined, wherein
the light entrance side of the optical lens and the light exit side of the optical lens are embodied in each case as a freeform surface for off-axis projection in such a way that the light beams emitted by the photodiodes arranged on a circular path around the central longitudinal axis are focused off-axis by means of the optical lens;
the central longitudinal axis defines an axis of symmetry of the optical lens, and
the light entrance side of the optical lens and/or the light exit side of the optical lens are/is embodied in accordance with a Zernike polynomial such that the following equation holds true for all points P(r, φ) of the light entrance side and/or of the light exit side in a cylindrical coordinate system—

$$z = \Sigma_{n=0}^{M} \Sigma_m (Z_n^m + Z_n^{-m}),$$

in which m lies in a range between −n and n, m is odd if n is odd, and m is even if n is even, in which m is divisible by N, and in which the following equations hold true—

$$Z_n^m = R_n^m * con(m * \varphi),$$

$$Z_n^{-m} = R_n^m * \sin(m * \varphi) \text{ and}$$

$$R_n^m(r) = \sum_{k=0}^{2} \frac{(-1)^k * (n-k)!}{k! * \left(\frac{n+k}{2} - k\right)! * \left(\frac{n-k}{2} - k\right)!} * \frac{r}{r_0}.$$

7. A photodiode equipped device comprising:
an optical lens according to claim 6; and
the at least two photodiodes,
wherein the optical lens is arranged at and/or in the photodiode-equipped device in such a way that the light beams emitted by the at least two photodiodes transmit into the optical lens through the light entrance side of the optical lens and emerge from the optical lens at the light exit side of the optical lens.

8. A method for producing an optical lens for a photodiode-equipped device comprising the following steps:
embodying the optical lens with a light entrance side and with a light exit side in such a way that after arranging the finished optical lens in the photodiode-equipped device, light beams emitted by at least two photodiodes of the photodiode-equipped device transmit into the optical lens through the light entrance side and emerge from the optical lens at the light exit side and a central longitudinal axis extending centrally through the light entrance side and centrally through the light exit side is present, wherein
the light entrance side of the optical lens and the light exit side of the optical lens are embodied in each case as a freeform surface for off-axis projection in such a way that the light beams emitted by the photodiodes arranged on a circular path around the central longitudinal axis are focused off-axis by means of the optical lens,
the central longitudinal axis defines an axis of symmetry of the optical lens, and
the light entrance side of the optical lens and/or the light exit side of the optical lens are/is embodied in accordance with a three-fold rotationally symmetrical polynomial term such that the following equation holds true for all points P(r, φ) of the light entrance side and/or of the light exit side in a cylindrical coordinate system—

$$z = \frac{cr^2}{1 + \sqrt{1 - (1+k) * c^2 * r^2}} + (\alpha * r^7 + \beta * r^5 + \gamma * r^3) * \cos(3\varphi),$$

in which c is a curvature, k is a conic constant and α, β and γ are polynomial coefficients in each case of the light entrance side and/or of the light exit side.

9. The method according to claim 8, wherein the optical lens is arranged with respect to a light-transmissive cover glass of a housing of the photodiode-equipped device in such a way that the light beams emerging from the optical lens at the light exit side transmit through the light-transmissive cover glass into external surroundings of the photodiode-equipped device, and wherein the light entrance side of the optical lens and the light exit side of the optical lens are embodied in each case as a freeform surface for off-axis projection in such a way that the light beams emitted by the at least two photodiodes and deflected by means of the optical lens intersect at a beam intersection point lying between the light exit side of the optical lens and the light-transmissive cover glass.

10. The method according to claim 8, wherein the optical lens is arranged with respect to the light-transmissive cover glass of the housing of the photodiode-equipped device in such a way that the light beams emerging from the optical lens at the light exit side transmit through the light-transmissive cover glass into external surroundings of the photodiode-equipped device, and wherein the light entrance side of the optical lens and the light exit side of the optical lens are embodied in each case as a freeform surface for off-axis projection in such a way that the light beams emitted by the at least two photodiodes and deflected by means of the optical lens intersect at a beam intersection point lying in the external surroundings of the photodiode-equipped device, said beam intersection point lying at a distance of at least 2 millimetres from the light-transmissive cover glass.

11. A method for producing an optical lens for a photodiode-equipped device comprising the following steps:
embodying the optical lens with a light entrance side and with a light exit side in such a way that after arranging the finished optical lens in the photodiode-equipped device, light beams emitted by at least two photodiodes of the photodiode-equipped device transmit into the optical lens through the light entrance side and emerge from the optical lens at the light exit side and a central longitudinal axis extending centrally through the light entrance side and centrally through the light exit side is present, wherein
the light entrance side of the optical lens and the light exit side of the optical lens are embodied in each case as a freeform surface for off-axis projection in such a way that the light beams emitted by the photodiodes arranged on a circular path around the central longitudinal axis are focused off-axis by means of the optical lens, the central longitudinal axis defines an axis of symmetry of the optical lens, and the light entrance side of the optical lens and/or the light exit side of the optical lens are/is embodied in accordance with a Zernike polynomial such that the following equation holds true for all points $P(r, \varphi)$ of the light entrance side and/or of the light exit side in a cylindrical coordinate system—

$$z = \Sigma_{n=0}^{M} \Sigma_m (Z_n^m + Z_n^{-m}),$$

in which m lies in a range between −n and n, m is odd if n is odd, and m is even if n is even, in which m is divisible by N, and in which the following equations hold true:

$$Z_n^m = R_n^m * con(m * \varphi),$$

$$Z_n^{-m} = R_n^m * \sin(m * \varphi) \text{ and}$$

$$R_n^m(r) = \sum_{k=0}^{2} \frac{(-1)^k * (n-k)!}{k! * \left(\frac{n+k}{2} - k\right)! * \left(\frac{n-k}{2} - k\right)!} * \frac{r}{r_0}.$$

12. The method according to claim 11, wherein the optical lens is arranged with respect to a light-transmissive cover glass of a housing of the photodiode-equipped device in such a way that the light beams emerging from the optical lens at the light exit side transmit through the light-transmissive cover glass into external surroundings of the photodiode-equipped device, and wherein the light entrance side of the optical lens and the light exit side of the optical lens are embodied in each case as a freeform surface for off-axis projection in such a way that the light beams emitted by the at least two photodiodes and deflected by means of the optical lens intersect at a beam intersection point lying between the light exit side of the optical lens and the light-transmissive cover glass.

13. The method according to claim 11, wherein the optical lens is arranged with respect to the light-transmissive cover glass of the housing of the photodiode-equipped device in such a way that the light beams emerging from the optical lens at the light exit side transmit through the light-transmissive cover glass into external surroundings of the photodiode-equipped device, and wherein the light entrance side of the optical lens and the light exit side of the optical lens are embodied in each case as a freeform surface for off-axis projection in such a way that the light beams emitted by the at least two photodiodes and deflected by means of the optical lens intersect at a beam intersection point lying in the external surroundings of the photodiode-equipped device, said beam intersection point lying at a distance of at least 2 millimetres from the light-transmissive cover glass.

* * * * *